United States Patent
Eran et al.

(10) Patent No.: US 11,757,796 B2
(45) Date of Patent: Sep. 12, 2023

(54) ZERO-COPY PROCESSING

(71) Applicant: MELLANOX TECHNOLOGIES, LTD., Yokneam (IL)

(72) Inventors: Haggai Eran, Yokneam Illit (IL); Liran Liss, Atzmon (IL); Yuval Shpigelman, Netanya (IL); Idan Burstein, Akko (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 22 days.

(21) Appl. No.: 17/488,362

(22) Filed: Sep. 29, 2021

(65) Prior Publication Data
US 2023/0099304 A1    Mar. 30, 2023

(51) Int. Cl.
*H04L 61/00* (2022.01)
*H04L 49/00* (2022.01)
*H04L 12/40* (2006.01)
*H04L 49/90* (2022.01)

(52) U.S. Cl.
CPC .... *H04L 49/3072* (2013.01); *H04L 12/40071* (2013.01); *H04L 49/9042* (2013.01)

(58) Field of Classification Search
CPC ........... H04L 49/3072; H04L 12/40071; H04L 49/9042
See application file for complete search history.

(56) References Cited

U.S. PATENT DOCUMENTS

| | | | |
|---|---|---|---|
| 9,817,786 B1* | 11/2017 | Khan | G11C 15/00 |
| 9,916,269 B1* | 3/2018 | Machulsky | G06F 13/4068 |
| 10,719,376 B2* | 7/2020 | Sanghi | G06F 15/17375 |
| 11,086,801 B1 | 8/2021 | Machulsky et al. | |
| 11,379,278 B2* | 7/2022 | Sanghi | G06F 9/544 |
| 2006/0075142 A1* | 4/2006 | Cornett | H04L 69/161 709/246 |

(Continued)

FOREIGN PATENT DOCUMENTS

WO    2018058403 A1    4/2018

OTHER PUBLICATIONS

Burstein et al., U.S. Appl. No. 17/189,303, filed Mar. 2, 2021.
EP Application #22198830.6 Search Report dated Feb. 7, 2023.
EP Application # 22198830.6 Search Report dated Jun. 13, 2023.

*Primary Examiner* — Abdelnabi O Musa
(74) *Attorney, Agent, or Firm* — KLIGLER & ASSOCIATES PATENT ATTORNEYS LTD

(57) ABSTRACT

In one embodiment, a system includes a peripheral device including a memory access interface to receive from a host device headers of packets, while corresponding payloads of the packets are stored in a host memory of the host device, and descriptors being indicative of respective locations in the host memory at which the corresponding payloads are stored, a data processing unit memory to store the received headers and the descriptors without the payloads of the packets, and a data processing unit to process the received headers, wherein the peripheral device is configured, upon completion of the processing of the received headers by the data processing unit, to fetch the payloads of the packets over the memory access interface from the respective locations in the host memory responsively to respective ones of the descriptors, and packet processing circuitry to receive the headers and payloads of the packets, and process the packets.

23 Claims, 11 Drawing Sheets

(56) References Cited

U.S. PATENT DOCUMENTS

| | | | |
|---|---|---|---|
| 2011/0283068 A1* | 11/2011 | Hung | G06F 13/28 |
| | | | 711/E12.001 |
| 2014/0177629 A1* | 6/2014 | Manula | H04L 49/201 |
| | | | 370/390 |
| 2015/0212795 A1* | 7/2015 | Ilan | G06F 9/5016 |
| | | | 711/126 |
| 2016/0330301 A1 | 11/2016 | Raindel et al. | |
| 2020/0204657 A1* | 6/2020 | Khan | H04L 69/22 |
| 2020/0220952 A1 | 7/2020 | Debbins et al. | |
| 2021/0117360 A1* | 4/2021 | Kutch | G06F 12/0802 |
| 2022/0021629 A1* | 1/2022 | Yefet | H04L 69/22 |
| 2022/0078089 A1* | 3/2022 | Sarangam | H04L 43/026 |

\* cited by examiner

ZERO-COPY PROCESSING

FIELD OF THE INVENTION

The present invention relates to computer systems, and in particular, but not exclusively to, processing data in a peripheral device.

BACKGROUND

Various types of computing systems comprise peripheral devices that serve various system components over a peripheral bus, e.g., a Peripheral Bus Interconnect express (PCIe) bus. Examples of such systems include a network adapter that connects multiple processors to a network, or a storage device that stores data for multiple processors. Computing systems of this sort typically also comprise a memory in which the system components store data. As part of serving a system component, a peripheral device may access the memory in order to read or write data.

SUMMARY

There is provided in accordance with an embodiment of the present disclosure, a system including a peripheral device including a memory access interface to receive from a host device headers of respective packets, while corresponding payloads of the respective packets are stored in a host memory of the host device, and descriptors being indicative of respective locations in the host memory at which the corresponding payloads are stored, a data processing unit memory to store the received headers and the descriptors without the payloads of the respective packets, and a data processing unit to process the received headers, wherein the peripheral device is configured, upon completion of the processing of the received headers by the data processing unit, to fetch the payloads of the respective packets over the memory access interface from the respective locations in the host memory responsively to respective ones of the descriptors, and packet processing circuitry to receive the headers and payloads of the respective packets, and process the packets.

Further in accordance with an embodiment of the present disclosure, the system includes the host device configured to run a given host driver configured to split data of the respective packets into the headers and the payloads, provide over the memory access interface to the data processing unit the headers and descriptors, and store the payloads of the respective packets at the respective locations in the host memory.

Still further in accordance with an embodiment of the present disclosure the host device is configured to run multiple virtual machines and corresponding multiple host drivers including the given host driver.

Additionally in accordance with an embodiment of the present disclosure the host device is configured to run a hypervisor, and the given host driver is for an emulated device exposed by the peripheral device.

Moreover in accordance with an embodiment of the present disclosure the peripheral device is configured to receive commands from the host device over the memory access interface to retrieve the respective packets with respective ones of the descriptors being indicative of respective locations in the host memory at which the respective packets are stored, and retrieve the headers of the respective packets over the memory access interface from the host memory responsively to receiving the commands, and respective descriptors.

Further in accordance with an embodiment of the present disclosure the memory access interface is configured to emulate a virtual input-output device so that the peripheral device appears to act as a virtual input-output device to the host device.

Still further in accordance with an embodiment of the present disclosure the packet processing circuitry is configured to receive the processed headers from the data processing unit and the payloads from the host memory, form respective whole ones of the packets from respective ones of the headers and payloads.

Additionally in accordance with an embodiment of the present disclosure the peripheral device includes a network interface controller including a network interface configured to be connected to a packet data network, and the packet processing circuitry is configured to receive the processed headers from the data processing unit and the payloads from the host memory, form respective whole packets from respective ones of the headers and payloads, and process the respective whole packets for sending to a destination device.

Moreover, in accordance with an embodiment of the present disclosure the packet processing circuitry is configured to send the respective whole packets to the destination device over the network interface over the packet data network.

Further in accordance with an embodiment of the present disclosure the destination device is a virtual machine running on the host device, and the packet processing circuitry is configured to send the respective whole packets to the destination device over the memory access interface.

Still further in accordance with an embodiment of the present disclosure the data processing unit is configured to perform any one or more of the following reorder the received headers thereby causing the respective packets to be reordered, update the received headers thereby causing the respective packets to be updated, delay the received headers thereby causing sending of the respective packets to be delayed, schedule the received headers thereby causing scheduling sending of the respective packets, segment the received headers thereby causing the payloads of the respective packets to be segmented, and duplicate the received headers thereby causing each of the respective packets to be sent multiple times.

Additionally in accordance with an embodiment of the present disclosure the packet processing circuitry includes a hardware accelerator, and is configured to receive the processed headers from the data processing unit and the payloads from the host memory, form respective whole packets from respective ones of the headers and payloads, and perform an acceleration operation on the respective whole packets.

Moreover, in accordance with an embodiment of the present disclosure the data processing unit configured to format the received headers responsively to a format used by the hardware accelerator.

There is also provided in accordance with another embodiment of the present disclosure, a network interface controller device including a network interface to be connected to a packet data network, and receive packets over the packet data network, a memory access interface to share data with a host device, a data processing unit memory, packet processing circuitry to split data of the packets into respective headers and respective payloads, store the respective payloads at respective locations in a host memory of the host device, and store the respective headers, without the respective payloads, in the data processing unit memory with descriptors indicative of the respective locations in the host memory at which the respective payloads are stored, a data processing unit to process the respective headers, wherein the packet processing circuitry is configured, upon completion of the processing of the respective headers by the data processing unit, to send respective completion messages to the host device over the memory access interface.

Further in accordance with an embodiment of the present disclosure the packet processing circuitry is configured, upon completion of the processing of the respective headers by the data processing unit, to store the respective headers in the host memory at respective locations, wherein the respective completion messages include the respective locations of the respective headers in the host memory.

Still further in accordance with an embodiment of the present disclosure the data processing unit is configured to perform any one or more of the following reorder the received headers thereby causing the packets to be reordered, update the received headers thereby causing the packets to be updated, delay the received headers thereby causing the respective packets to be delayed, schedule the received headers thereby causing scheduling sending of the respective packets, segment the received headers thereby causing the payloads of the respective packets to be segmented, and duplicate the received headers thereby causing each of the respective packets to be sent multiple times.

There is also provided in accordance with still another embodiment of the present disclosure, a method, including receiving from a host device headers of respective packets, while corresponding payloads of the respective packets are stored in a host memory of the host device, and descriptors being indicative of respective locations in the host memory at which the corresponding payloads are stored, storing the received headers and the descriptors without the payloads of the respective packets, processing the received headers by a data processing unit, upon completion of the processing of the received headers by a data processing unit, fetching the payloads of the respective packets from the respective locations in the host memory responsively to respective ones of the descriptors, receiving the headers and payloads of the respective packets, and processing the packets.

Additionally in accordance with an embodiment of the present disclosure, the method includes running a given host driver, splitting data of the respective packets into the headers and the payloads, providing over a memory access interface the headers and descriptors, and storing the payloads of the respective packets at the respective locations in the host memory.

Moreover, in accordance with an embodiment of the present disclosure, the method includes receiving commands from the host device to retrieve the respective packets with respective ones of the descriptors being indicative of respective locations in the host memory at which the respective packets are stored, and retrieving the headers of the respective packets from the host memory responsively to receiving the commands, and respective descriptors.

Further in accordance with an embodiment of the present disclosure, the method includes receiving the processed headers from the data processing unit and the payloads from a memory access interface, and forming respective whole ones of the packets from respective ones of the headers and payloads.

Still further in accordance with an embodiment of the present disclosure, the method includes processing the respective whole packets for sending to a destination device.

Additionally in accordance with an embodiment of the present disclosure, the method includes performing an acceleration operation on the respective whole packets.

There is also provided in accordance with still another embodiment of the present disclosure, a networking method, including receiving packets over a packet data network, sharing data with a host device, splitting data of the packets into respective headers and respective payloads, storing the respective payloads at respective locations in a host memory of the host device, storing the respective headers, without the respective payloads, in a data processing unit memory with descriptors indicative of the respective locations in the host memory at which the respective payloads are stored, processing the respective headers, and upon completion of the processing of the respective headers, sending respective completion messages to the host device.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
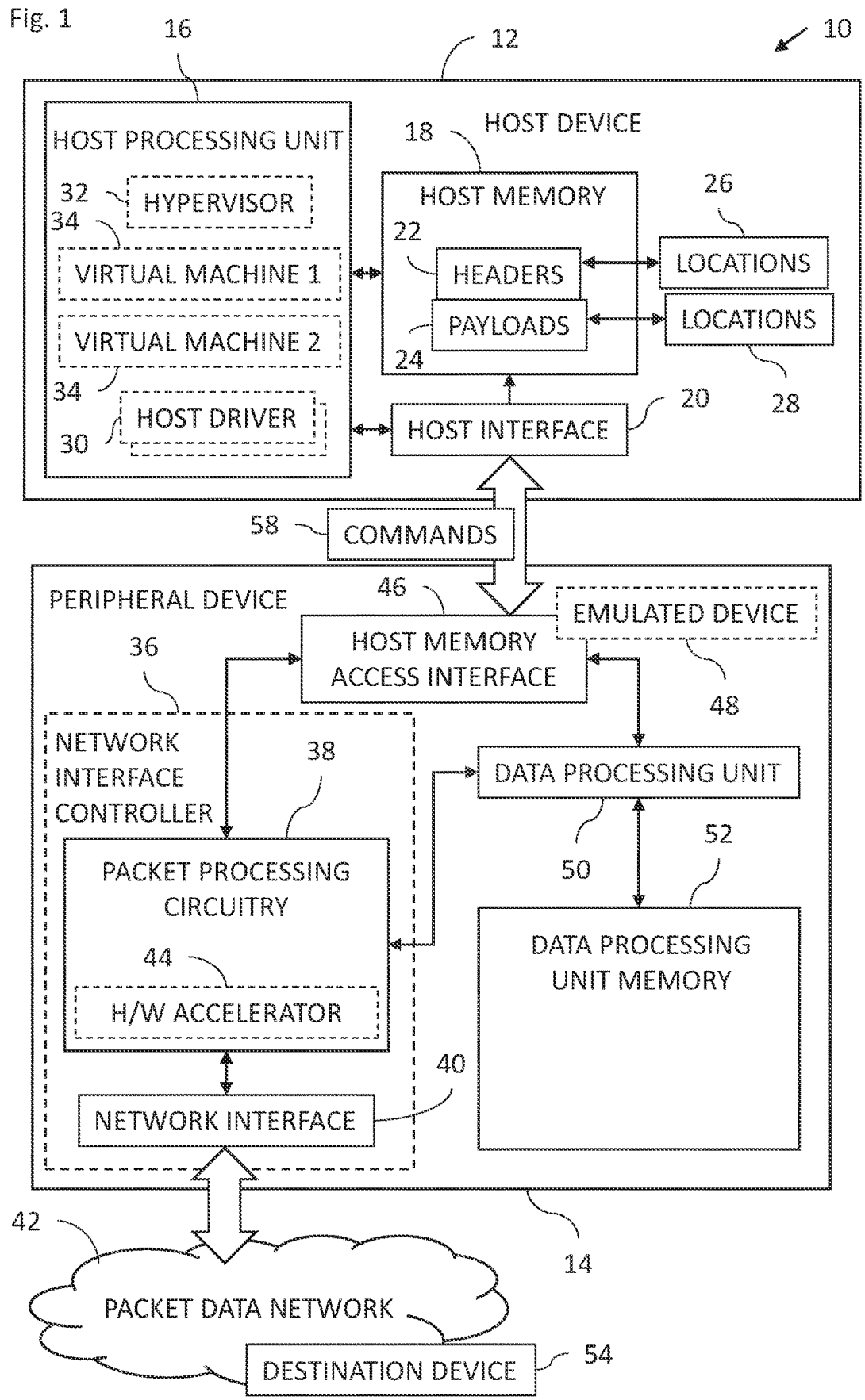
FIG. 1 is a block diagram view of a computer system constructed and operative in accordance with an embodiment of the present invention.

Various types of computing systems comprise a peripheral device that serves multiple system components over at least one peripheral bus. Examples of such systems include a network adapter that connects multiple processors to a network, or a storage device that stores data for multiple processors. The peripheral bus may comprise, for example, a Peripheral Bus Interconnect express (PCIe) bus.

Any of the system components and/or the peripheral device may be physical or virtual. In a virtualized system, for example, a physical computer hosts one or more Virtual Machines (VMs). The physical computer typically runs virtualization software ("hypervisor") that allocates physical resources to the VMs. Specifically, the hypervisor assigns resources of the peripheral device to the VMs ("virtualizes the peripheral device"). For example, each VM may be assigned a Virtual Network Interface Controller (VNIC) in a physical network adapter, and/or a virtual disk (VDISK) in a physical disk. Typically, each VM, as well as the hypervisor, has a respective network association (also referred to as network identity, one example being an IP address). The hypervisor may provide some services using its own network association, e.g., in storage services provided to VMs. Other services, e.g., VM-to-VM communication, will use the VM's network association.

A computing system of this sort (physical or virtualized) typically, also comprises at least one memory, in which the system components are assigned respective address spaces. The address space assigned to a certain system component is typically associated with a respective address translation, e.g., between virtual addresses used by the system component and physical addresses of the memory.

Systems such as described above often enable a peripheral device to access the memory directly while serving a system component. Example use-cases include a network device that scatters and/or gathers packets, a storage device that services requests and scatters and/or gathers data, or a Remote Direct Memory Access (RDMA) Network Interface Controller (NTC) that performs large memory transactions.

In order to enable direct memory access, the peripheral device is typically made aware of the address space and corresponding address translation used by the system component. For example, a VNIC that serves a VM may hold a local copy of the address translation used by the VM, and use this local copy to access the VM's address space in the memory directly. In such an implementation, each address translation may be identified by an identifier, or handle, referred to as "MKEY". The NIC may hold, for example, a Translation and Protection Table (TPT), accessed by {VM identifier, MKEY}, which holds local copies of the various address translations used by the various VDTs. MKEYs are primarily used to translate virtual addresses into physical addresses, and to abstract complicated scatter and gather operations.

Conventionally, a given system component (e.g., physical CPU or VM) is only capable of accessing its own address space in the memory, and is entirely unaware of and has no access to address spaces of other system components. A peripheral device, too, is conventionally only able to access the address space of the system component it is assigned to serve. In various practical use-cases, however, it can be highly beneficial if a peripheral device could access an address space of one system component while serving another system component. Such a capability would enable collaboration between system components in performing complex tasks, while accessing the memory efficiently with minimal address translations and data transfer. Such a capability enables decoupling of the control of the function and its association from the actual data transfer. U.S. patent application Ser. No. 17/189,303 of Burstein, et al., filed Mar. 2, 2021, and entitled "Cross Address-Space Bridging", which is incorporated herein by reference, describes methods and systems, in which a peripheral device is given the capability and permission to access an address space of one system component while serving another system component.

The peripheral device, such as a smart NIC, may include packet processing circuitry for processing received packets or packets to be sent over a network or to perform a data acceleration task on the packets, such as encryption or decryption. The peripheral device may also include a data processing unit (DPU) to process headers of the packets to perform such tasks as reordering packets, sorting packets, updating headers, delaying the packets, scheduling the packets, segmenting packets, and/or duplicating packets). The DPU may include one or more processing cores to perform the processing tasks.

In one solution, the DPU processes receives the packets from the host device via the host memory (or from the packet processing circuitry) and stores the packets in DPU memory for processing. Once the packets are processed, the packets are passed to the packet processing circuitry for further processing (e.g., sending over a network to a remote device or to another VM running on the host) or passed to the host device via the host memory. The above solution is problematic as all the packets are transferred to, and stored in, the DPU memory. This creates a bandwidth problem around the DPU memory and may overload the DPU memory resulting in a degradation in the performance in the peripheral device.

Therefore, embodiments of the present invention solve the above problems by storing headers of packets in the DPU memory for processing by the DPU while corresponding payloads of the packets are stored in the host memory at respective locations. Multiple descriptors indicative of the respective locations of the corresponding payloads are also stored in the DPU memory with the headers so that at a later stage the processed headers may be matched up with the corresponding payloads either by the host device or by the packet processing circuitry.

The DPU may process the headers and perform such tasks as reordering packets (via reordering the headers), sorting packets (via sorting the headers), updating headers, delaying the packets (via the headers), scheduling the packets (via the headers), segmenting packets (via the headers), and/or duplicating packets (by duplicating headers). The DPU may include one or more processing cores to perform the processing tasks.

In some embodiments, (e.g., as part of a packet sending process and/or an accelerator process) the host device sends commands to the peripheral device to process packets stored in the host memory. The peripheral device retrieves the headers of the packets from the host memory and stores, in the DPU memory, the headers (for processing by the DPU) and descriptors of the locations of the payloads stored in host memory.

In other embodiments, (e.g., as part of a packet sending process and/or an accelerator process) a host driver running on the host device splits packets into headers and corresponding payloads, and store the payloads at respective locations in the host memory while headers are sent to, or otherwise retrieved by, the peripheral device for storage in the DPU memory (along with the descriptors of the location of the corresponding payloads stored in the host memory) for processing by the DPU.

In some embodiments, the host device runs multiple host drivers. For example, the host device may run a hypervisor running multiple virtual machines (e.g., VMs) and corresponding host drivers for each virtual machine. The host drivers may interface with an emulated device exposed by the peripheral device. The peripheral device may emulate a virtual input-output device so that the peripheral device appears to act as a virtual input-output device to the host device.

In some embodiments, (e.g., as part of the packet sending process and/or the accelerator process) the DPU retrieves the headers from the DPU memory and processes the headers. Once the headers are processed by the DPU, the peripheral device retrieves the corresponding payloads from the host memory based on the stored descriptors. The packet processing circuitry then forms whole packets from the processed headers retrieved from the DPU and the corresponding payloads retrieved from the host memory. The packet processing circuitry then processes the whole packets. In some embodiments, the packet processing circuitry may include a hardware accelerator which optionally processes the whole packets, for example, performing encryption and/or decryption, and returns the whole packets back to the originating VM or device. Additionally, or alternatively, the packet processing circuitry processes the whole packets for sending to a remote device over a packet data network, or to another VM running on the host device.

In some embodiments the DPU may notify the host or VM driver that packet transmission is complete using transmission completion messages. The Host or VM driver may then free up buffer reserved for the now completed packet transmission. The DPU typically performs the task of notifying the host or VM driver of packet transmission completion as the DPU is aware of packet duplication and retransmission issues.

In some embodiments, the peripheral device includes a NIC including packet processing circuitry and a network interface. The NIC receives packets over the packet data network via the network interface. The packet processing circuitry processes the received packets, splits the packets into headers and corresponding payloads. The NIC stores the headers in the DPU memory (for further processing by the DPU) and the corresponding payloads in the host memory. The descriptors of the locations of the payloads are also stored in the DPU memory. Once the DPU completes processing of the headers, the NIC or DPU may store the processed headers in the host memory and send completion messages (including the descriptors indicating the locations of the processed headers and corresponding payloads in the host memory) to the host device. The host device may retrieve the headers and corresponding payloads for further processing and/or storage.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Figure 2:
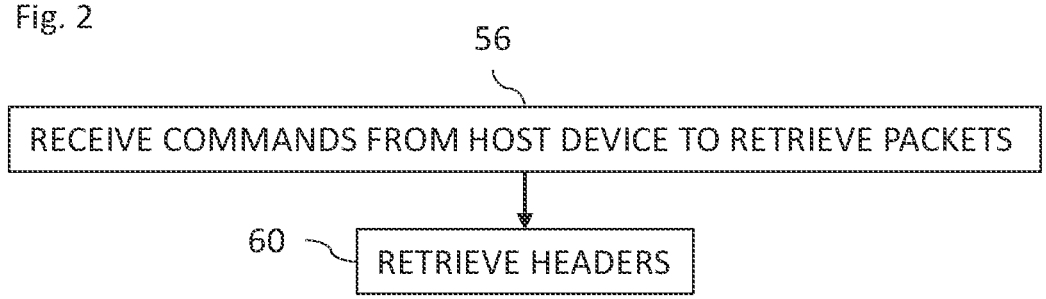
FIG. 2 is a flowchart including steps in a method of operation of the peripheral device of FIG. 1.

Reference is now made to FIGS. 1 and 2. FIG. 1 is a block diagram view of a computer system 10 constructed and operative in accordance with an embodiment of the present invention. FIG. 2 is a flowchart including steps in a method of operation of the peripheral device of FIG. 1.

The computer system 10 includes a host device 12 and a peripheral device 14. The host device 12 includes a host processing unit 16, a host memory 18, and host interface 20. The host memory 18 is configured to store data used by the host processing unit 16 or by the peripheral device 14. The host memory 18 may stores payloads 24 of packets (stored at respective locations 28 in the host memory 18), and corresponding headers 22 of the packets (stored at respective locations 26 in the host memory 18). In some embodiments, described hereinbelow, the headers 22 are not stored in the host memory 18. The host interface 20 is configured to transfer data with the peripheral device 14. The host interface 20 may include any suitable interface, for example, but not limited to, a peripheral bus interface, e.g., PCIe Interface.

The host processing unit 16 of the host device 12 may be configured to run one or more host drivers 30, described in more detail below. In some embodiments, the host processing unit 16 of the host device 12 is configured to run a hypervisor 32, which is configured to run multiple virtual machines 34 with corresponding multiple host drivers 30.

In practice, some or all of the functions of the host processing unit 16 described herein may be combined in a single physical component or, alternatively, implemented using multiple physical components. These physical components may comprise hard-wired or programmable devices, or a combination of the two. In some embodiments, at least some of the functions of the host processing unit 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The peripheral device 14 includes a network interface controller 36, which includes packet processing circuitry 38, and a network interface 40. The network interface 40 is configured to be connect to a packet data network 42, and receive packets from, and send packets to, devices over the packet data network 42. The packet processing circuitry 38 is configured to process received packets and/or packets for sending. The packet processing circuitry 38 may include a physical layer (PHY) chip, and a MAC (layer) chip. In some embodiments, the packet processing circuitry 38 may include a hardware accelerator 44. The functionality of the hardware accelerator 44 is described in more detail with reference to FIGS. 12 and 13.

The peripheral device 14 also includes a host memory access interface 46 for sharing data with the host device 12 (e.g., to and from the host memory 18 of the host device 12) via the host interface 20. The host memory access interface 46 may be configured to emulate a virtual input-output device 48 so that the peripheral device 14 appears to act as a virtual input-output device to the host device 12. The host drivers 30 are configured to act as drivers for the emulated device 48 exposed by the peripheral device 14.

The peripheral device 11 also includes a data processing unit 50 and a data processing unit memory 52. The data processing unit memory 52 is configured to store data used by the data processing unit 50.

The components of the packet processing circuitry 38 (e.g., (PHY) chip, and a MAC (layer) chip) and the other elements of the peripheral device 14 such as the data processing unit 50, and the hardware accelerator 44 may be combined into a single system-on-chip implementation, or some of the above elements of the peripheral device 14 may be grouped together on more than one chip.

The host device 12 may provide packets for the peripheral device 11 to process. For example, the host device 12 may provide packets to the peripheral device 14 to process and send to a destination device 54 over the packet data network 42, or from one of the virtual machines 34 (e.g., VM1) to another one of the virtual machines 34 (e.g., VM2) running on the host processing unit 16 of the host device 12 or another remote device, and/or to be processed by the hardware accelerator 44.

The peripheral device 14 is configured to receive (block 56) commands 58 from the host device 12 over the host memory access interface 46 to retrieve respective packets (the headers 22 together with the payloads 24) with respective descriptors being indicative of respective locations 26 in the host memory 18 at which the respective packets are stored. Instead of retrieving both the headers 22 and the payloads 24 at the same time, the packet processing circuitry 38 or the data processing unit 50 of the peripheral device 14 is configured to retrieve (block 60) the headers 22 of the respective packets over the host memory access interface 46 from the host memory 18 responsively to: receiving the commands 58; and respective descriptors indicative of respective locations 26 in the host memory 18 at which the headers 22. The headers 22 and descriptors are then stored in the data processing unit memory 52.

In some embodiments, described in more detail with reference to FIG. 3, the packets are split into the headers 22 and the payloads 24 by the host device 12. The headers 22 or links (including descriptors of the locations 26) to the headers 22 are sent to the peripheral device 11.

In practice, some or all of the functions of the data processing unit 50 described herein may be combined in a single physical component or, alternatively, implemented using multiple physical components. These physical components may comprise hard-wired or programmable devices, or a combination of the two. In some embodiments, at least some of the functions of the data processing unit 50 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
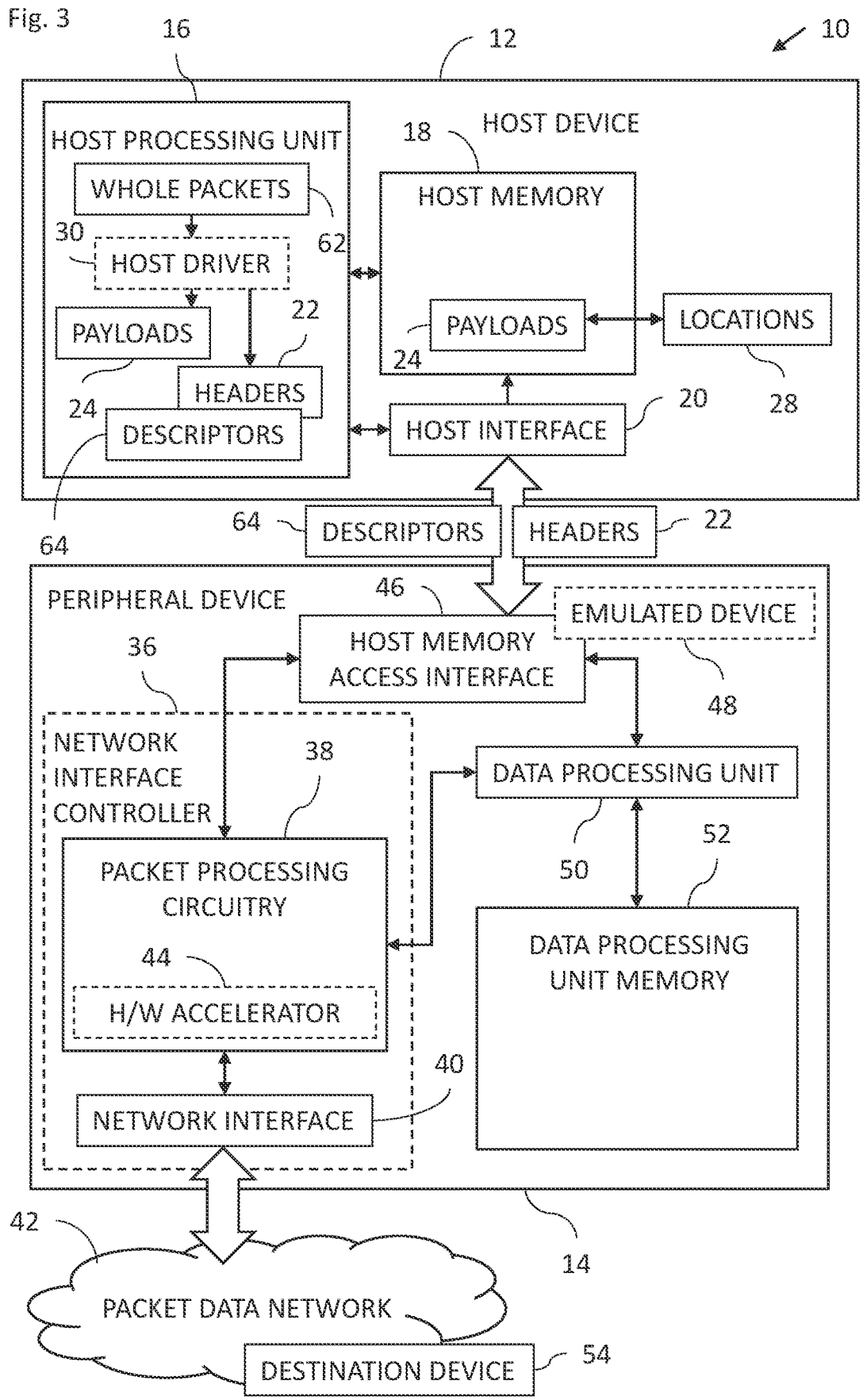
FIGS. 3-5 are block diagram views of the computer system of FIG. 1 illustrating various processing stages.
Figure 4:
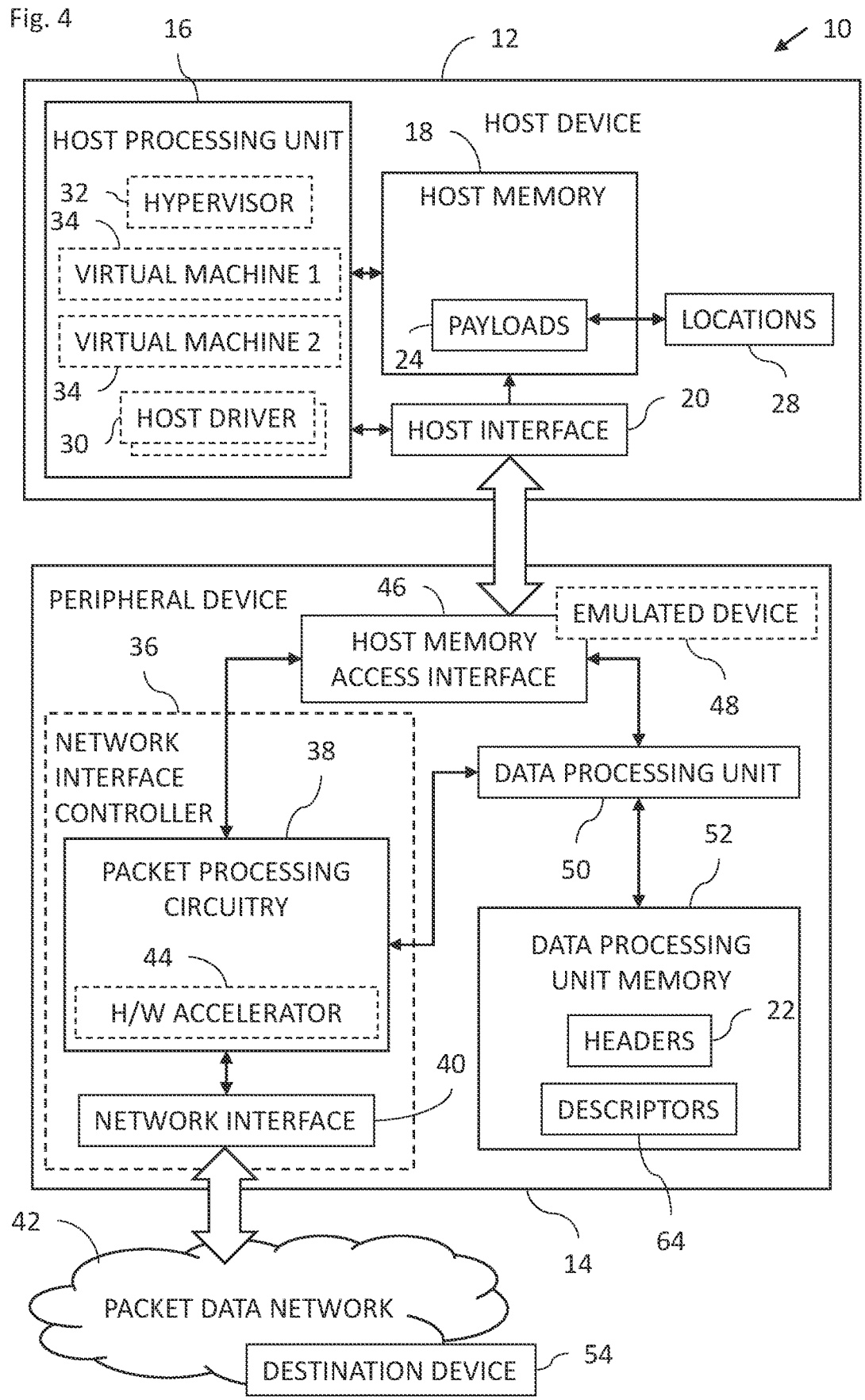
Figure 5:
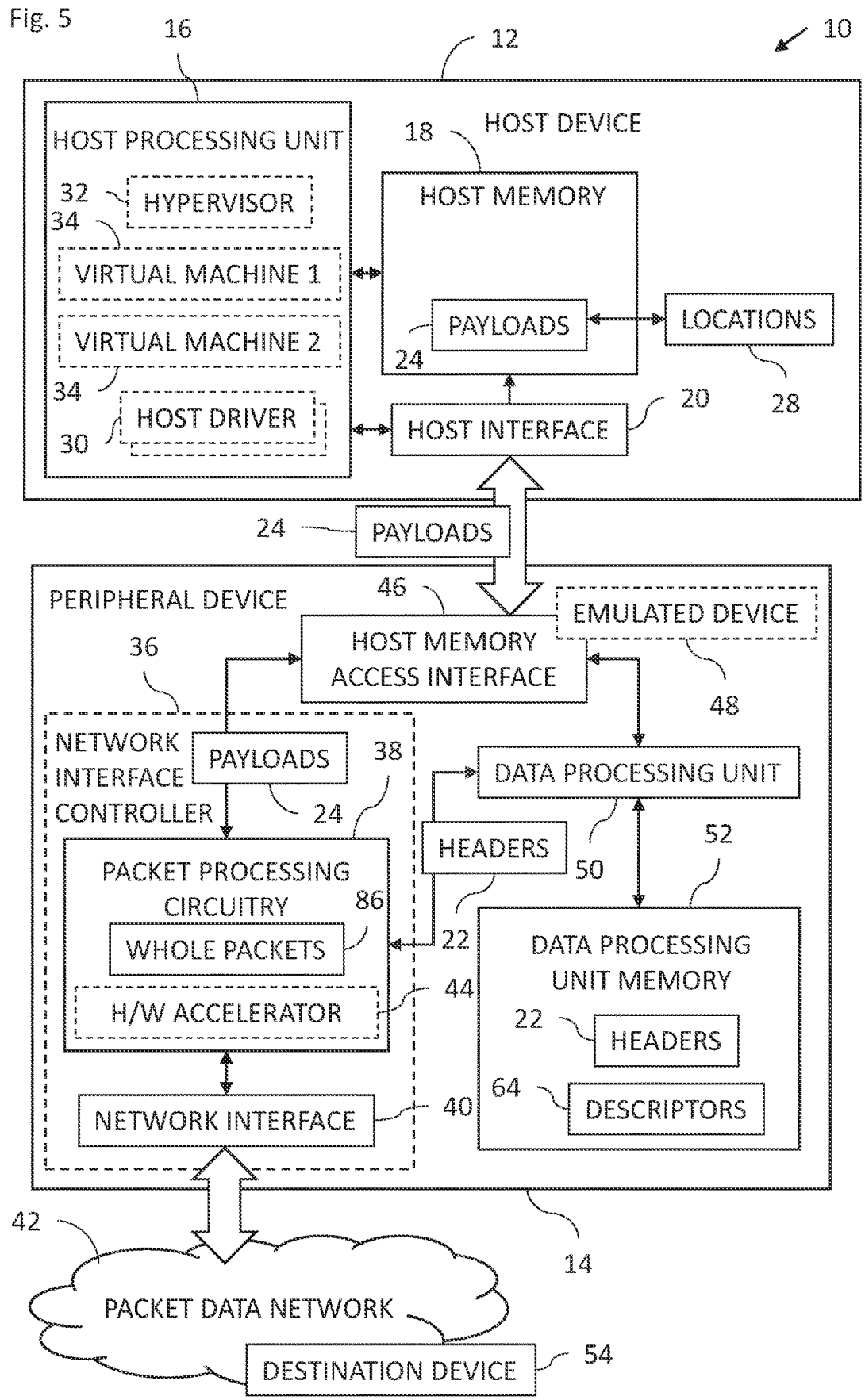

Reference is now made to FIGS. 3-5, which are block diagram views of the computer system 10 of FIG. 1 illustrating various processing stages.

FIG. 3 shows one of the host drivers 30 splitting whole packets 62 into the headers 22 and payloads 24 and storing the payloads 24 at respective locations 28 in the host memory 18. The host driver 30 also generates descriptors 64 of the locations 28. The headers 22 and descriptors 61 and sent to the peripheral device 14 over the host interface 20. The hypervisor 32 and virtual machines 34 are not shown in FIG. 3 for the sake of simplicity.

FIG. 4 shows the data processing unit 50 storing the headers 22 and descriptors 64 in the data processing unit memory 52. The data processing unit 50 may process the headers 22 as described in more detail with reference to FIG. 7.

FIG. 5 shows that after the data processing unit 50 has processed the headers 22, the payloads 24 are retrieved from the host memory 18 by the data processing unit 50 or the packet processing circuitry 38 responsively to the descriptors 64 stored in the data processing unit memory 52. The packet processing circuitry 38 then receives the payloads 24 from the host memory 18, and the processed headers 22 from the data processing unit memory 52.

Figure 6:
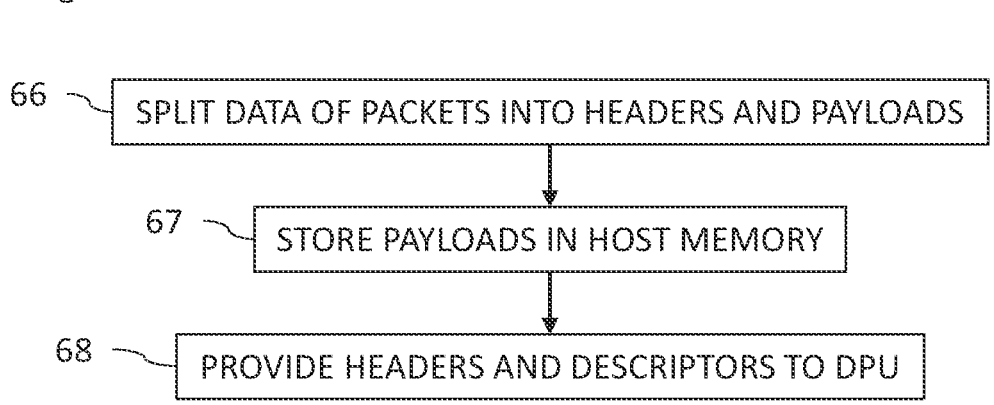
FIG. 6 is a flowchart including steps in a method performed by a host device of the system of FIG. 1.

Reference is now made to FIG. 6, which is a flowchart 65 including steps in a method performed by the host device 12 of the system 10 of FIG. 1. Reference is also made to FIGS. 3-5. One of the host drivers 30 is configured to: split data (block 66) of the respective packets 62 into the headers 22 and the payloads 24; store (block 67) the payloads 24 of the respective packets 62 at the respective locations 28 in the host memory 18; provide (block 68) over the memory access interface 46 to the data processing unit 50 the headers 22 and descriptors 64.

Figure 7:
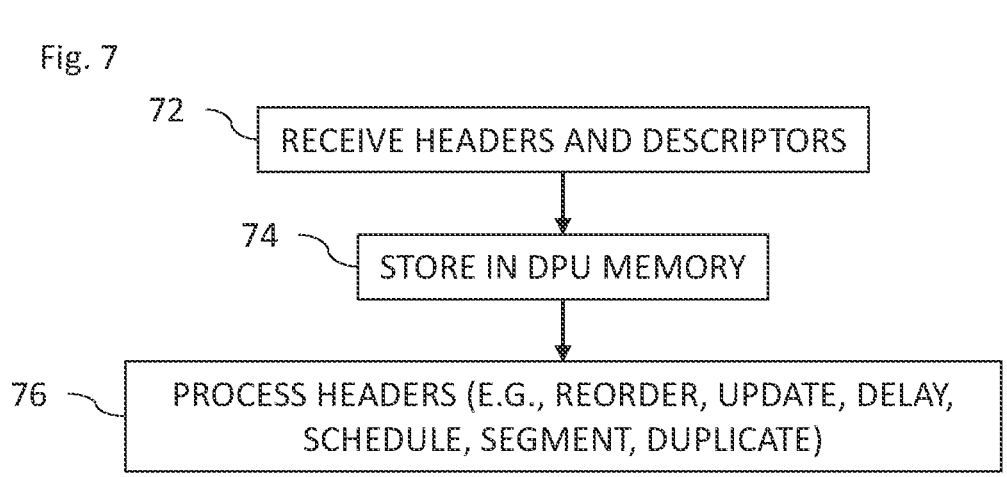
FIGS. 7 and 8 are flowchart including steps in methods performed by a peripheral device of the system of FIG. 1.

Reference is now made to FIG. 7, which is a flowchart 70 including steps in a method performed by the host memory access interface 46 and the data processing unit 50. Reference is also made to FIGS. 3-4. The host memory access interface 46 is configured to receive (block 72) from the host device 12: the headers 22 of the respective whole packets 62, while corresponding payloads 24 of the respective packets 62 are stored in the host memory 18 of the host device 12; and the descriptors 64 indicative of respective locations 28 in the host memory 18 at which the corresponding payloads 24 are stored. The data processing unit 50 is configured to store (block 74) the received headers 22 and the descriptors 64 without the payloads 24 in the data processing unit memory 52. Therefore, the data processing unit memory 52 is configured to store the received headers 22 and the descriptors 64 without the payloads 24 of the respective packets. The data processing unit 50 is configured to process (block 76) the received headers 22.

The data processing unit 50 is configured to perform any one or more of the following processing tasks: reorder the received headers 22 thereby causing the respective packets 62 to be reordered; update the received headers 22 thereby causing the respective packets 62 to be updated; delay the received headers 22 thereby causing sending of the respective packets 62 to be delayed; schedule the received headers 22 thereby causing scheduling sending of the respective packets 62; segment the received headers 22 thereby causing the payloads 24 of the respective packets 62 to be segmented; aid/or duplicate the received headers 22 thereby causing each of the respective packets 62 to be sent multiple times.

Figure 8:
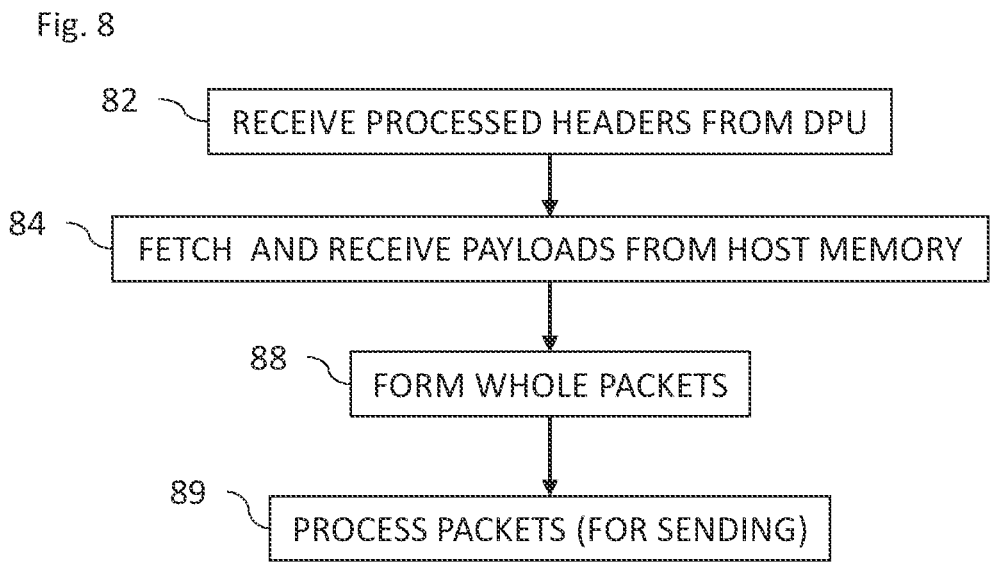

Reference is now made to FIG. 8, which is a flowchart 80 including steps in a method performed by the packet processing circuitry 38. Reference is also made to FIG. 5.

The packet processing circuitry 38 is configured to receive (block 82) the processed headers 22 from the data processing unit 50. The packet processing circuitry 38 is configured, upon completion of the processing of the received headers 22 by the data processing unit 50, to fetch and receive (block 84) the payloads 24 of the respective packets 62 over the host memory access interface 46 from the respective locations 28 in the host memory 18 responsively to respective ones of the descriptors 64 (received from the data processing unit 50 and previously stored in the data processing unit memory 52). The packet processing circuitry 38 is configured to form (block 88) respective whole packets 86 from respective ones of the headers 22 and payloads 24.

The packet processing circuitry 38 is configured to process (block 89) the whole packets 86. In some embodiments, the packet processing circuitry 38 is configured to process the packets 86 for sending to the destination device 54 over the network interface 40 over the packet data network 42, or to one of the virtual machines 34 in the host device 12 over the host memory access interface 46 (acting as a virtual port vPort).

Once the packets 86 have been sent and acknowledgment of has been received (from the destination device), the packet processing circuitry 38 and/or the data processing unit 50 is configured to delete the payloads 24 (and optionally the headers 22) from the data processing unit memory 52 and the host memory 18 and/or inform the host device 12 (e.g. VM driver or other host driver) via one or more completion messages that the packets 86 have been sent so that the host device 12 may free up memory reserved for the payloads 24 (and optionally the headers 22) for other data (e.g., other packets, header, payloads).

Figure 9:
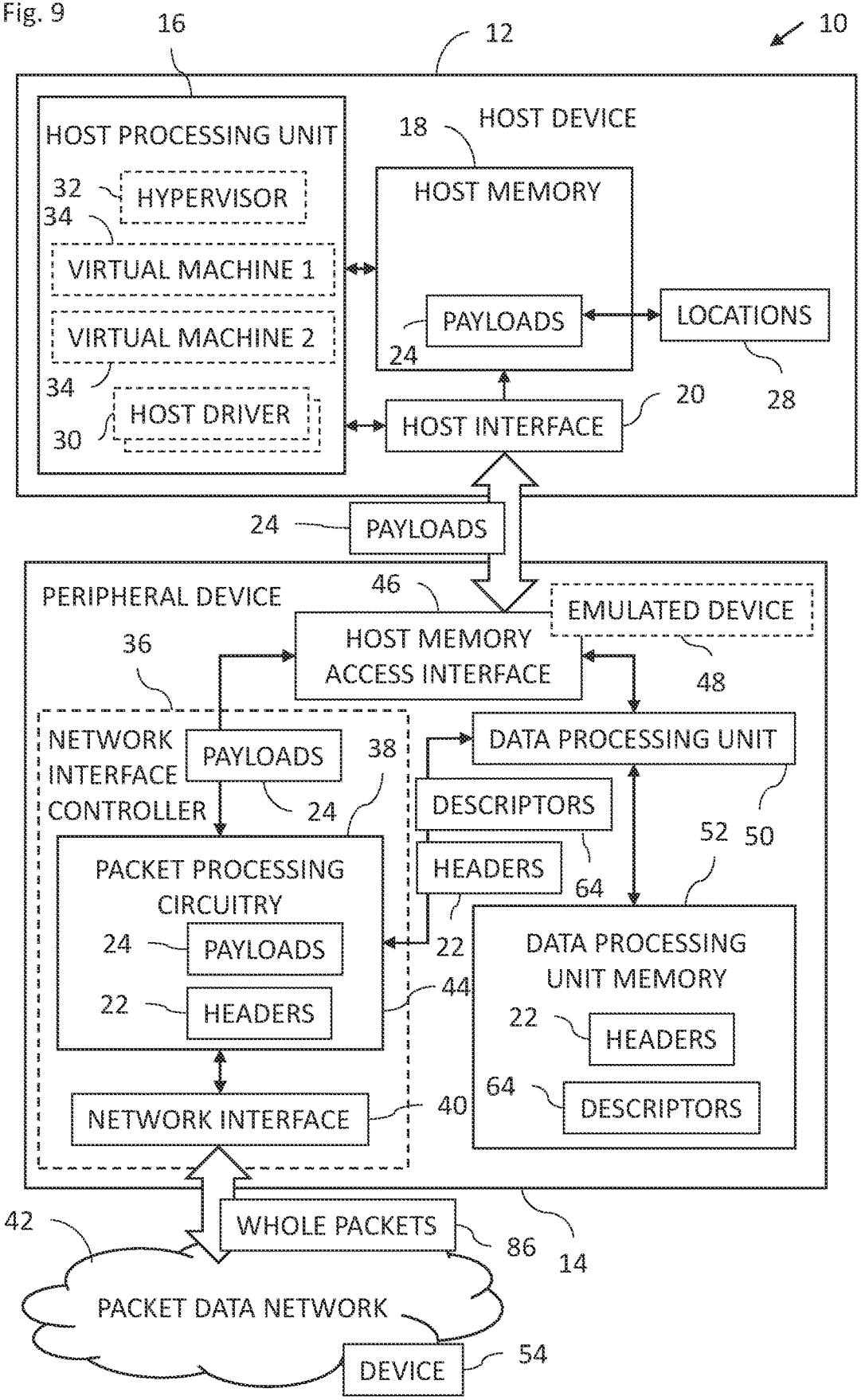
FIG. 9 is a block diagram of the computer system of FIG. 1 illustrating processing received packets.
Figure 10:
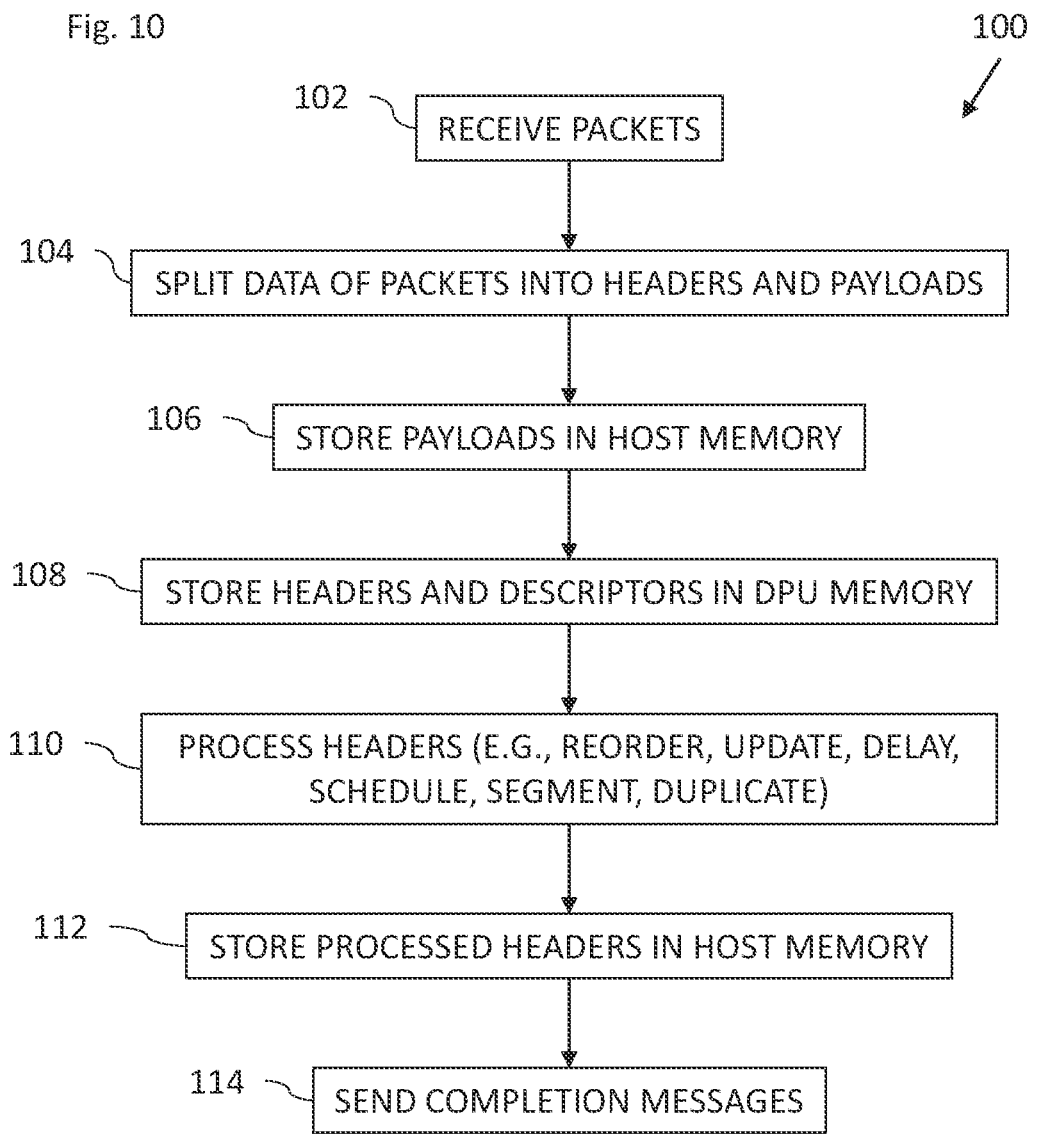
FIG. 10 is a flowchart including steps in a method to process received packets in the system of FIG. 9.

Reference is now made to FIG. 9, which is a block diagram of the computer system 10 of FIG. 1 illustrating processing received packets 86. Reference is also made to FIG. 10, which is a flowchart 100 including steps in a method to process received packets 86 in the system 10 of FIG. 9. The hardware accelerator 44 is not shown in FIG. 9 for the sake of simplicity.

The network interface 40 is configured to receive (block 102) the packets 86 over the packet data network 42 from the device 54.

The packet processing circuitry 38 is configured to: split data (block 104) of the packets 86 into respective headers 22 and respective payloads 24; and store (block 106) the respective payloads 24 at respective locations 28 in the host memory 18 of the host device 12; and store (block 108) the respective headers 22, without the respective payloads 24, in the data processing unit memory 52 with descriptors 64 indicative of the respective locations 28 in the host memory 18 at which the respective payloads 24 are stored.

The data processing unit 50 is configured to process (block 110) the respective headers 22 stored in the data processing unit memory 52. The data processing unit 50 is configured to perform any one or more of the following: reorder the received headers thereby causing the packets to be reordered; update the received headers thereby causing the packets to be updated; delay the received headers thereby causing the respective packets to be delayed; schedule the received headers thereby causing scheduling sending of the respective packets; segment the received headers thereby causing the payloads of the respective packets to be segmented; and duplicate the received headers thereby causing each of the respective packets to be sent multiple times.

Figure 11:
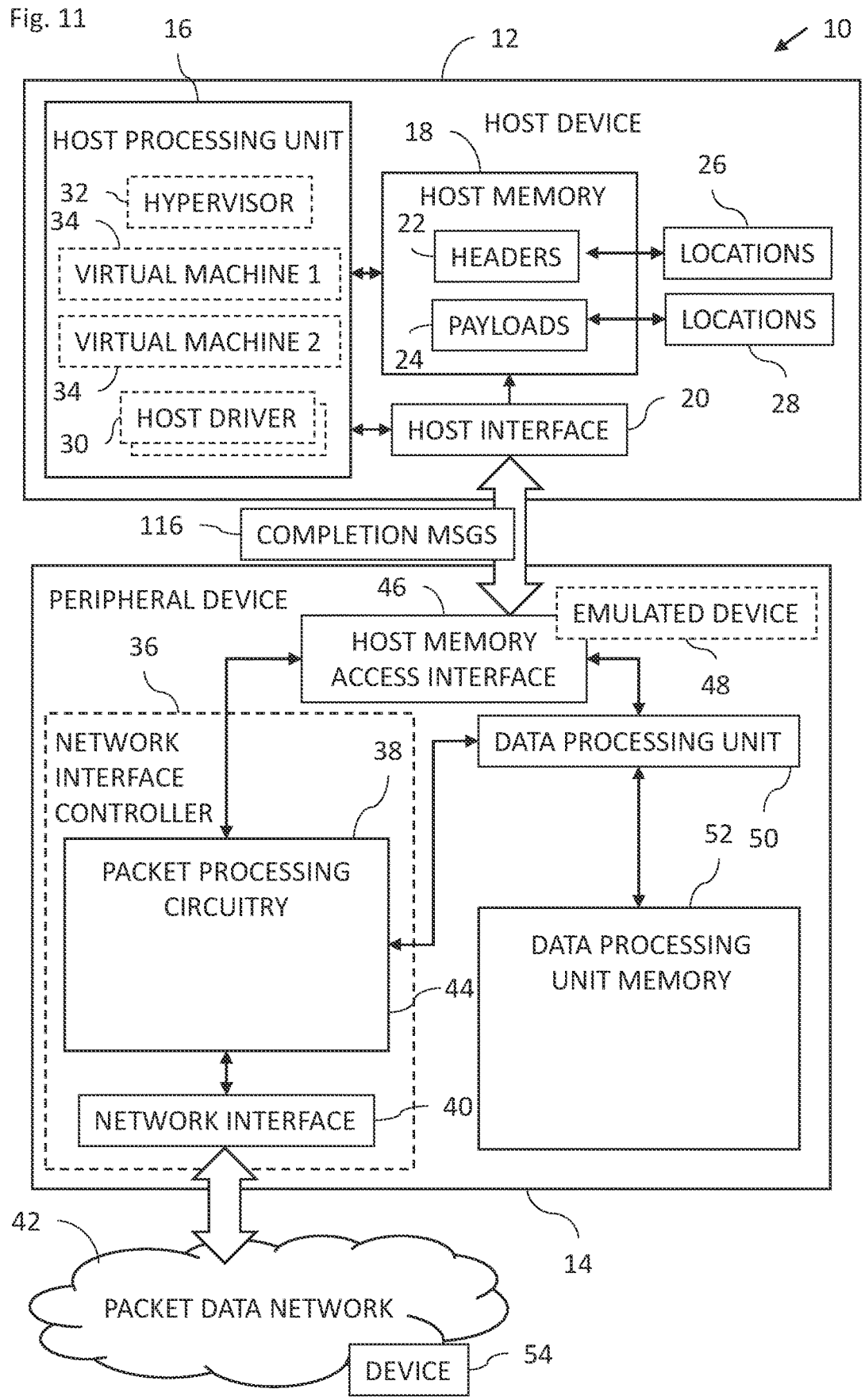
FIG. 11 is a block diagram of the computer system of FIG. 9 illustrating completion processing of the received packets.

Reference is now made to FIG. 11, which is a block diagram of the computer system 10 of FIG. 9 illustrating completion processing of the received packets 86. Reference is also made to FIG. 10. The hardware accelerator 44 is not shown in FIG. 11 for the sake of simplicity.

The data processing unit 50 or the packet processing circuitry 38 is configured upon completion of the processing of the respective headers 22 by the data processing unit 50, to store (block 112) the respective processed headers 22 in the host memory 18 at respective locations 26.

The packet processing circuitry or the data processing unit 50 is configured, upon completion of the processing of the respective headers 22 by the data processing unit 50, to send (block 114) respective completion messages 116 (including the respective locations 26) to the host device 12 over the host memory access interface 46 informing the host device 12 that the packets 86 have completed processing by the peripheral device 14. The host processing unit 16 may then retrieve the headers 22 and payloads 24 for further processing.

Figure 12:
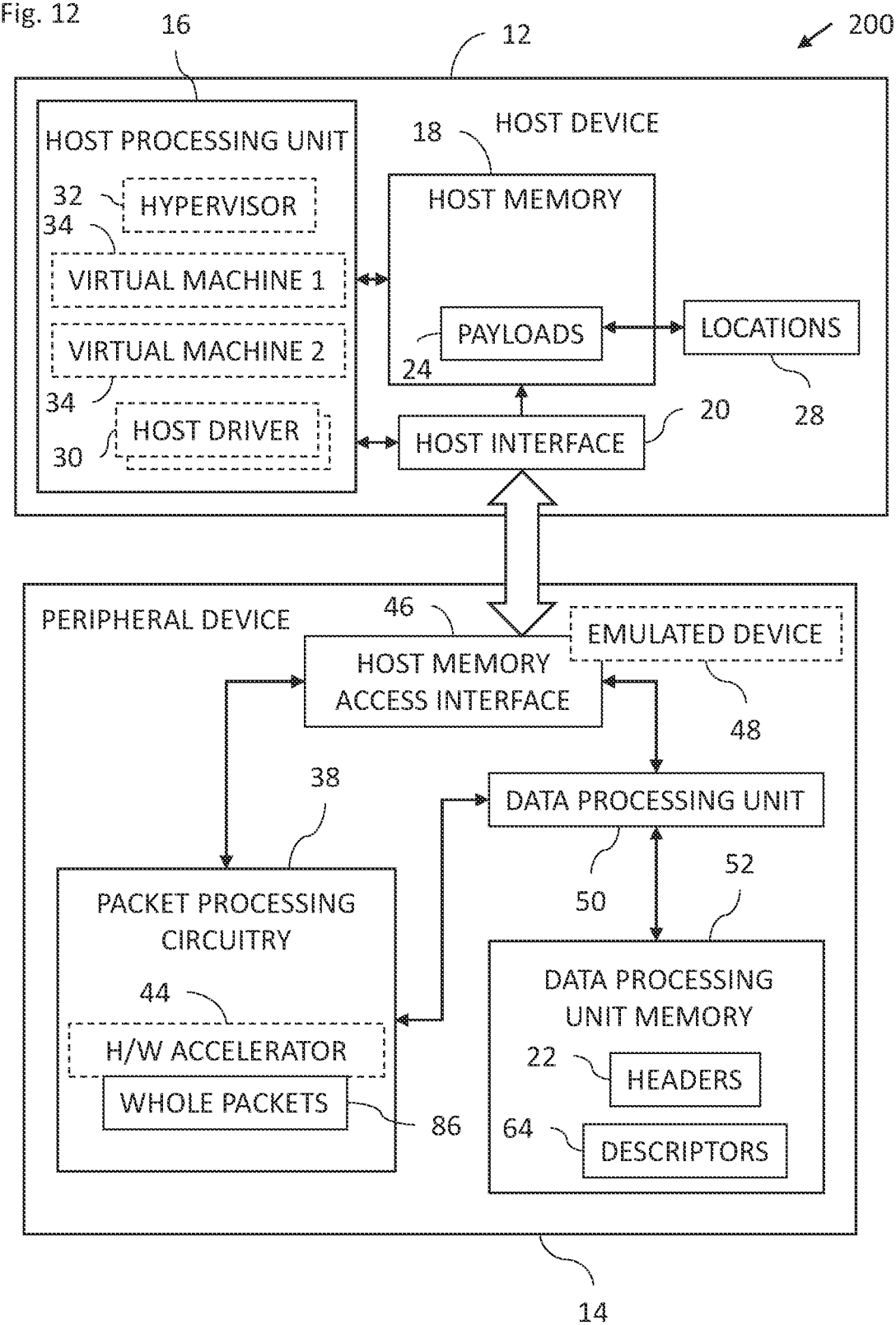
FIG. 12 is a block diagram of a computer system constructed and operative in accordance with another embodiment of the present invention.
Figure 13:
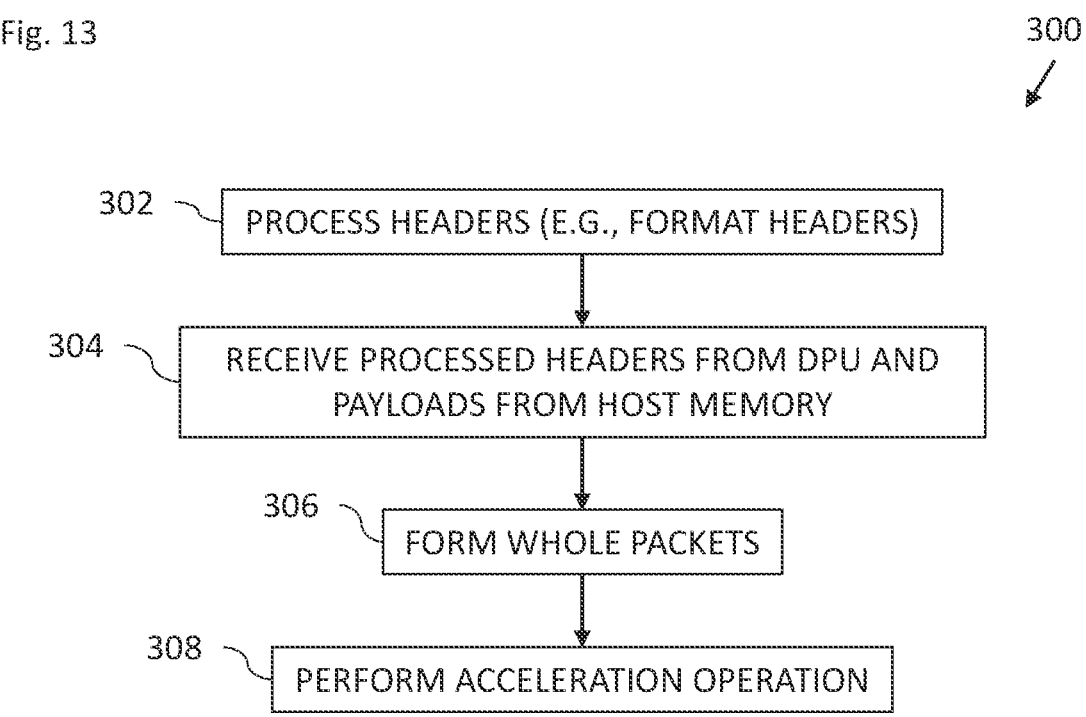
FIG. 13 is a flowchart including steps in a method of operation of the system of FIG. 12.

Reference is now made to FIG. 12, which is a block diagram of a computer system 200 constructed and operative in accordance with another embodiment of the present invention. Reference is also made to FIG. 13, which is a flowchart 300 including steps in a method of operation of the system 200 of FIG. 12.

The computer system 200 is substantially the same as the computer system 10 of FIGS. 1-11 except that the computer system 200 does not include the network interface controller 36 and the network interface 40.

The host device 12 may instruct the peripheral device 14 to process packets in the hardware accelerator 44. The host device 12 may split the packets into the headers 22 and payloads 24 and provide the headers 22 to the peripheral device 14. In some embodiments, the host device 12 may provide whole packets to the peripheral device 14 and the peripheral device 14 may retrieve the headers 22 and leave the payloads 24 in the host memory 18 for later retrieval as described above.

The data processing unit 50 is configured to process (block 302) the headers 22 previously stored in the data processing unit memory 52. In some embodiments, the data processing unit 50 is configured to format the received headers 22 responsively to a format used by the hardware accelerator 44.

The packet processing circuitry 38 is configured to fetch and receive (block 304) the processed headers 22 from the data processing unit 50, and the payloads 24 from the host memory 18 of the host device 12 responsively to the descriptors 64 (received from the data processing unit 50 and previously stored in the data processing unit memory 52). The packet processing circuitry 38 is configured to form (block 306) whole packets 86 from the respective headers 22 and payloads 24. The hardware accelerator 44 of the packet processing circuitry 38 is then configured to perform (block 308) an acceleration operation e.g., encryption or decryption).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising a peripheral device including:
 a memory access interface to receive from a host device:
  headers of respective packets, while corresponding payloads of the respective packets are stored in a host memory of the host device; and descriptors being indicative of respective locations in the host memory at which the corresponding payloads are stored;
 a data processing unit memory to store the received headers and the descriptors without the payloads of the respective packets; and
 a data processing unit to process the received headers, and to perform any one or more of the following:
  reorder the received headers thereby causing the respective packets to be reordered;
  delay the received headers thereby causing sending of the respective packets to be delayed;
  schedule the received headers thereby causing scheduling sending of the respective packets;
  segment the received headers thereby causing the payloads of the respective packets to be segmented; and
  duplicate the received headers thereby causing each of the respective packets to be sent multiple times,
  wherein the peripheral device is configured, upon completion of the processing of the received headers by the data processing unit, to fetch the payloads of the respective packets over the memory access interface from the respective locations in the host memory responsively to respective ones of the descriptors; and
 packet processing circuitry to receive the headers and payloads of the respective packets; and process the packets.

2. The system according to claim 1, further comprising the host device configured to run a given host driver configured to:
 split data of the respective packets into the headers and the payloads;

provide over the memory access interface to the data processing unit the headers and descriptors; and store the payloads of the respective packets at the respective locations in the host memory.

3. The system according to claim 2, wherein the host device is configured to run multiple virtual machines and corresponding multiple host drivers including the given host driver.

4. The system according to claim 2, wherein: the host device is configured to run a hypervisor, and the given host driver is for an emulated device exposed by the peripheral device.

5. The system according to claim 1, wherein the peripheral device is configured to:

receive commands from the host device over the memory access interface to retrieve the respective packets with respective ones of the descriptors being indicative of respective locations in the host memory at which the respective packets are stored; and retrieve the headers of the respective packets over the memory access interface from the host memory responsively to respective descriptors and receiving the commands.

6. The system according to claim 1, wherein the packet processing circuitry is configured to: receive the processed headers from the data processing unit and the payloads from the host memory; form respective whole ones of the packets from respective ones of the headers and payloads.

7. The system according to claim 1, wherein:

the peripheral device includes a network interface controller comprising a network interface configured to be connected to a packet data network; and the packet processing circuitry is configured to:

receive the processed headers from the data processing unit and the payloads from the host memory;

form respective whole packets from respective ones of the headers and payloads; and process the respective whole packets for sending to a destination device.

8. The system according to claim 7, wherein the packet processing circuitry is configured to send the respective whole packets to the destination device over the network interface over the packet data network.

9. The system according to claim 7, wherein: the destination device is a virtual machine running on the host device; and the packet processing circuitry is configured to send the respective whole packets to the destination device over the memory access interface.

10. The system according to claim 1, wherein the data processing unit is configured to delay the received headers thereby causing sending of the respective packets to be delayed.

11. The system according to claim 1, wherein the data processing unit is configured to schedule the received headers thereby causing scheduling sending of the respective packets.

12. The system according to claim 1, wherein the data processing unit is configured to duplicate the received headers thereby causing each of the respective packets to be sent multiple times.

13. A network interface controller device comprising:

a network interface to be connected to a packet data network, and receive packets over the packet data network;

a memory access interface to share data with a host device;

a data processing unit memory;

packet processing circuitry to:

split data of the packets into respective headers and respective payloads;

store the respective payloads at respective locations in a host memory of the host device; and store the respective headers, without the respective payloads, in the data processing unit memory with descriptors indicative of the respective locations in the host memory at which the respective payloads are stored;

a data processing unit to process the respective headers, and to perform any one or more of the following:

reorder the received headers thereby causing the packets to be reordered;

delay the received headers thereby causing the respective packets to be delayed;

schedule the received headers thereby causing scheduling sending of the respective packets;

segment the received headers thereby causing the payloads of the respective packets to be segmented; and duplicate the received headers thereby causing each of the respective packets to be sent multiple times, wherein the packet processing circuitry is configured, upon completion of the processing of the respective headers by the data processing unit, to send respective completion messages to the host device over the memory access interface.

14. The device according to claim 13, wherein the packet processing circuitry is configured, upon completion of the processing of the respective headers by the data processing unit, to store the respective headers in the host memory at respective locations, wherein the respective completion messages include the respective locations of the respective headers in the host memory.

15. The device according to claim 13, wherein the data processing unit is configured to reorder the received headers thereby causing the packets to be reordered.

16. A method, comprising:

receiving from a host device: headers of respective packets, while corresponding payloads of the respective packets are stored in a host memory of the host device; and descriptors being indicative of respective locations in the host memory at which the corresponding payloads are stored;

storing the received headers and the descriptors without the payloads of the respective packets;

processing the received headers by a data processing unit, including performing any one or more of the following:

reordering the received headers thereby causing the respective packets to be reordered;

delaying the received headers thereby causing sending of the respective packets to be delayed;

scheduling the received headers thereby causing scheduling sending of the respective packets;

segmenting the received headers thereby causing the payloads of the respective packets to be segmented; and duplicating the received headers thereby causing each of the respective packets to be sent multiple times;

upon completion of the processing of the received headers by a data processing unit, fetching the payloads of the respective packets from the respective locations in the host memory responsively to respective ones of the descriptors;

receiving the headers and payloads of the respective packets; and processing the packets.

17. The method according to claim 16, further comprising:
running a given host driver;
splitting data of the respective packets into the headers and the payloads;
providing over a memory access interface the headers and descriptors; and
storing the payloads of the respective packets at the respective locations in the host memory.

18. The method according to claim 16, further comprising:
receiving commands from the host device to retrieve the respective packets with respective ones of the descriptors being indicative of respective locations in the host memory at which the respective packets are stored; and
retrieving the headers of the respective packets from the host memory responsively to respective descriptors and receiving the commands.

19. The method according to claim 16, further comprising:
receiving the processed headers from the data processing unit and the payloads from a memory access interface; and
forming respective whole ones of the packets from respective ones of the headers and payloads.

20. The method according to claim 19, further comprising processing the respective whole packets for sending to a destination device.

21. The method according to claim 19, further comprising performing an acceleration operation on the respective whole packets.

22. A networking method, comprising:
receiving packets over a packet data network;
sharing data with a host device;
splitting data of the packets into respective headers and respective payloads;
storing the respective payloads at respective locations in a host memory of the host device;
storing the respective headers, without the respective payloads, in a data processing unit memory with descriptors indicative of the respective locations in the host memory at which the respective payloads are stored;
processing the respective headers including performing any one or more of the following:
reordering the received headers thereby causing the packets to be reordered;
delaying the received headers thereby causing the respective packets to be delayed;
scheduling the received headers thereby causing scheduling sending of the respective packets;
segmenting the received headers thereby causing the payloads of the respective packets to be segmented; and
duplicating the received headers thereby causing each of the respective packets to be sent multiple times; and
upon completion of the processing of the respective headers, sending respective completion messages to the host device.

23. A system comprising a peripheral device including:
a memory access interface to receive from a host device:
headers of respective packets, while corresponding payloads of the respective packets are stored in a host memory of the host device; and descriptors being indicative of respective locations in the host memory at which the corresponding payloads are stored wherein the memory access interface is configured to emulate a virtual input-output device so that the peripheral device appears to act as a virtual input-output device to the host device;
a data processing unit memory to store the received headers and the descriptors without the payloads of the respective packets; and
a data processing unit to process the received headers, wherein the peripheral device is configured, upon completion of the processing of the received headers by the data processing unit, to fetch the payloads of the respective packets over the memory access interface from the respective locations in the host memory responsively to respective ones of the descriptors; and
packet processing circuitry to receive the headers and payloads of the respective packets; and process the packets.

* * * * *